United States Patent [19]
Klämt

[11] Patent Number: 5,247,840
[45] Date of Patent: Sep. 28, 1993

[54] BENDING ELEMENT FOR A FORCE-MEASURING APPARATUS

[75] Inventor: Joachim Klämt, Göppingen-Manzen, Fed. Rep. of Germany

[73] Assignee: Eckardt AG, Stuttgart, Fed. Rep. of Germany

[21] Appl. No.: 710,552

[22] Filed: Jun. 5, 1991

[30] Foreign Application Priority Data

Jun. 29, 1990 [DE] Fed. Rep. of Germany ....... 4020741

[51] Int. Cl.$^5$ ............................................. G01L 1/04
[52] U.S. Cl. ............................ 73/862.637; 73/862.636
[58] Field of Search ......... 73/862.62, 862.65, 862.632, 73/862.634, 862.637, 862.639, 727; 428/627, 553, 556; 29/621.1; 338/4

[56] References Cited

U.S. PATENT DOCUMENTS

| | | |
|---|---|---|
| 3,191,700 | 6/1965 | McKenna ............................ 428/627 |
| 4,650,722 | 3/1987 | Brown et al. ........................ 428/627 |
| 4,761,344 | 8/1988 | Maki et al. .......................... 428/627 |
| 4,884,451 | 12/1989 | Schulze ............................. 73/727 X |

*Primary Examiner*—Donald O. Woodiel
*Assistant Examiner*—Elizabeth L. Dougherty
*Attorney, Agent, or Firm*—Burns, Doane, Swecker & Mathis

[57] ABSTRACT

A force measuring apparatus comprises a steel base body and a bending element joined thereto. The bending element comprises a composite of at least first and second layers. The first layer is comprised of steel and is welded to the base body. The second layer is comprised of a hard material which is harder than the steel material of the first layer. The second layer includes a section of reduced thickness defining a bending region to which a deformation sensor is attached to sense deformations of said bending region in response to the application of the force being sensed.

7 Claims, 1 Drawing Sheet

BENDING ELEMENT FOR A FORCE-MEASURING APPARATUS

BACKGROUND OF THE INVENTION

The invention concerns a force measuring or bending element used in an apparatus for measuring forces.

Such an apparatus comprises a base body (usually metal) to which the bending element is connected. The bending element has a section of reduced thickness which defines a bending region. In response to the application of the force to be measured, the bending element becomes bent at the bending region. By positioning sensing elements, such as strain gauges, at the bending region, the amount of deformation and, hence, the magnitude of the force, can be determined.

Conventional bending elements for a force measuring apparatus have been proposed in numerous configurations, as evidenced for example in German Documents No. 31 48 670 and 32 25 857. The bending elements usually are made of steel, in which connection reference is also made to the bending element disclosed in German Document 27 53 549.

There are numerous requirements for the material from which a bending element is to be formed, such as for example: high hardness and mechanical strength, good workability and weldability, uniform material structure without residual stresses, and the like. The use of a steel material for the bending elements represents a compromise for those requirements. For example, even though steel exhibits good workability and weldability, the bending strength of steel for a given elastic modulus is not very satisfactory. Even the use of special steels, such as those known from aerospace technology, bring only slight improvements, while rendering the structural part significantly more expensive.

A much greater bending strength could be obtained from the use of a ceramic or crystalline material, but those materials exhibit poor workability properties, and it is difficult to obtain a satisfactory connection of such a bending element with the mostly metal base body of the force measuring apparatus.

It is, therefore, an object of the invention to provide a bending element for a force measuring apparatus having an improved ratio of bending strength to modulus of elasticity, and the ability of being joined to the base body of the force measuring apparatus securely and without difficulty.

SUMMARY OF THE INVENTION

The present invention relates to a measuring or bending element which is joinable to a base body of a force measuring apparatus. The bending element comprises a composite of at least first and second layers. The first layer is comprised of a steel material and defines a mounting portion of the bending element to be joined to the base body. The second layer is comprised of a sintered hard metal which is harder than the steel material and defines a bending region of the bending element adapted to be deformed by a force being measured.

Preferably, the second layer includes at least one section of reduced thickness which defines the bending region.

Additional sections of reduced thickness may be provided to define respective bending regions in the second layer.

A third layer formed of the sintered hard metal could be provided, whereby each of the second and third layers defines a bending region.

The present invention also involves a force measuring apparatus which includes the above-described bending element, as well as a method of making a bending element. The method comprises sintering the hard metal against the first layer such that the second layer is simultaneously formed and joined to the first layer.

Preferably, the sintering is performed by hot isostatic pressing, and is performed such that an elongated body is formed which comprises a stack of the composites which are subsequently separated from one another.

The bending element of the invention may be joined with a conventional base body without problems by means of a normal weld connection. At the same time, this bending element has a significantly higher bending strength for a given module of elasticity than an all-steel configuration, since the bending region comprises a sintered metal produced by powder metallurgy methods, the bending strength of which is considerably higher than that of melted steel. The connection between the sintered metal and the melted metal material is very strong, while the problems for example of a ceramic-metal joint do not appear in the case of this type of composite workpiece.

A force measuring apparatus containing a bending element according to the invention may be used to measure appreciably higher force ranges, and the overload capacities may be clearly improved.

The bending element has particularly advantageous material properties if the sintering process is carried out by hot isostatic pressing.

Furthermore, the novel bending element may be produced by means of simple working and processing methods. Thus, in contrast to ceramic materials, this material may be etch or eroded without difficulty even in its sintered meal area. The composite material blanks may be prepared in a highly economical manner by forming an elongated body in a single sintering process which alternatingly contains sintered and steel sections, an cutting that body into sections. Such an elongated body would preferably have a circular or rectangular cross-section. The production of bending elements with several parallel bending ranges is especially simple.

BRIEF DESCRIPTION OF THE DRAWINGS

The objects and advantages of the invention will become apparent from the following detailed description of preferred embodiments thereof in connection with the accompanying drawings, in which like numerals designate like elements, and in which.

DETAILED DESCRIPTION OF PREFERRED EMBODIMENTS OF THE INVENTION

Figure 1:
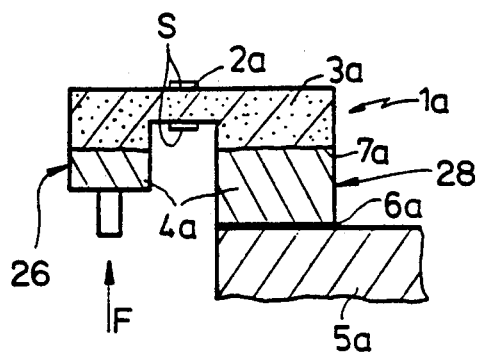
FIG. 1 is a cross-sectional view of a first embodiment of a force measuring apparatus with a bending element in the form of a cantilever mounted bending bar.

In each of the four disclosed embodiments of a bending element for a force measuring apparatus according to the present invention, shown in FIGS. 1–4, respectively, a portion of a force measuring apparatus is shown in crosssection. Each apparatus includes a base body 5a, 5b, 5c, or 5d and a bending element 1a, 1b, 1c, or 1d. The crosssection of the bending element 1a - 1d has at least one region of reduced thickness, mostly approximately in the center, to define at least one bending region 2a, 2b, 2c, 2'c, or 2'd. On the top and/or the bottom side of those bending regions 2a - 2'd sensors, for example strain gauges S, are mounted in a conventional manner. In this fashion, the deformation of the bending element 1a - 1d in the bending region 2a - 2'd upon exposure to a force F may be determined by conventional measuring methods. One side of the bending element 1a - 1d is connected by means of a weld joint 6a -6d with the base body 5a -5d.

The bending element 1a - 1d is made in the form of a composite comprised of at least two layers. A first layer 4a, 4b, 4c, or 4d located adjacent the base body 5a -5d comprises a steel material as does the base body 5a -5d. A high-strength welded joint 6a -6d can therefore be easily created between the first layer and the base body. A second layer 3a, 3b, 3c, 3'c, or 3d of the bending element, in particular the layer containing the bending region 2a - 2'd, comprises a sinterable metal alloy, such as cemented tungsten carbide for example. The joining of the sintered metal layer 3a - 3d with the steel layer 4a - 4d along a connecting surface 7a, 7b, 7c, or 7d is performed during the same sintering process in which the second layer is formed. That is, the forming of the second layer and its bonding to the first layer are carried out simultaneously. The magnitude of the mechanical strength along the connecting surface 7a, 7b, 7c, or 7d of such a "hot weld" is on the order of that of the weld joint 6a -6d and therefore does not represent a critical value or weak link relative to the operation of the force measuring device.

A bending strength appreciably better than that of the steel is obtained by the sintered metal layer 3a - 3d at a desired elastic modulus. As this second layer 3a - 3d contains in particular the bending region 2a - 2'd of the bending element 1a - 1d, it is possible to use the force measuring apparatus over a relatively larger range of measuring forces than is possible with conventional bending elements. Even if the conventional lower force measuring range were retained, the overload capacity of the measuring layout would be considerably enhanced.

The bending elements 1a - 1d are prepared by a sintering process preferably carried out by hot isostatic pressing, and the sintered metal layers 3a - 3d and their connection with the steel areas 4a - 4d are produced along the surfaces 7a -7d. By means of a subsequent processing, for example erosion by spark machining, the desired final shape of the bending element can be obtained.

Figure 5:
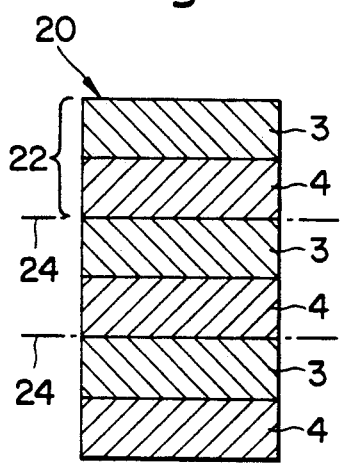
FIG. 5 a cross-sectional view through an elongated body from which a bending element according to the present invention can be obtained.

For example, an elongated body 20 preferably of circular or rectangular cross-section can be produced in a single sintering process (see FIG. 5). The body alternatingly contains sintered and steel sections 3, 4, so that a plurality of composite blanks 22 each comprised of one layer 3 and one layer 4 may be obtained in a single sintering process. The blanks 22 would be separated from one another by cutting the body 20 along the lines 24. The final bending element shape would be obtained by a suitable eroding of the composite, e.g., by spark machining. Bending elements of such a material composition yield the most favorable properties relative to the afore-mentioned requirements of these structural parts.

In FIG. 1, a force F to be measured is acting directly on a leg 26 of a two-layer composite bending element 1a in the form of a bending bar. The bar is U-shaped in cross-section and rectangular in its top element (not shown). The other leg 28 of the bending bar 1a is fastened to the stationary steel base body 5a by means of the weld joint 6a. The ends of both legs of the bending element 1a are formed by the steel layer 4a. The bending region 2a is contained in the sintered metal layer 3a.

Figure 2:
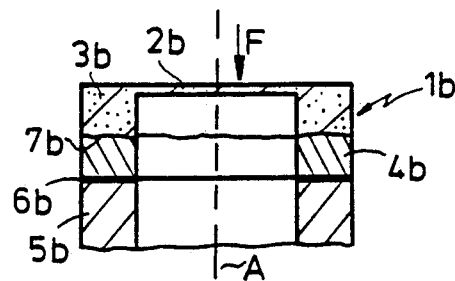
FIG. 2 is a cross-sectional view of a second embodiment of a force measuring apparatus with a bending element in the form of a bending membrane.

FIG. 2 shows a longitudinal section through a cylindrical bending element 1b having a longitudinal axis A and a bending region in the form of a circular bending membrane 2b. The bending element is fastened to a circular rim of a base body 5b by means of a weld joint 6b. The bending element 1b is again a two-layer composite piece, with the annular steel part 4b located adjacent the base body 5b. The sintered metal part 3b includes the bending region 2b.

Figure 3:
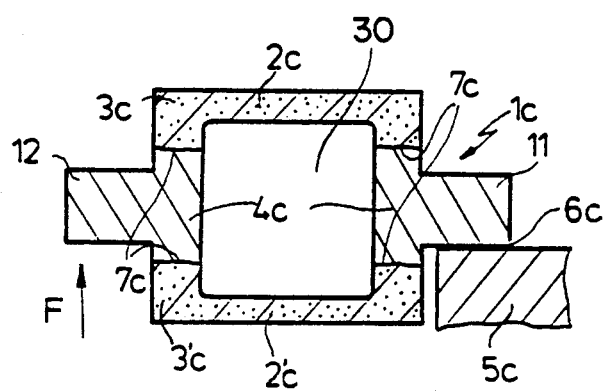
FIG. 3 is a cross-sectional view of a third embodiment of a force measuring apparatus with a bending element having two parallel bending regions.

The bending element 1c depicted in FIG. 3 is rectangular as seen in a top element and is in the form of a bending bar having two parallel bending regions 2c, 2'c. The steel layer 4c forms an interruption 30 which is bridged on opposite sides by two sintered metal layers 3c, 3'c. Each layer 3c, 3'c is U-shaped in cross section and includes a bending region 2c, 2'c. Such a three-layer bending element may be produced in this configuration in a simple manner by the appropriate processing of a three-layer composite sintered metal-steel-sintered metal blank. Such an arrangement of, in effect, two bending bars increases the measuring accuracy. The steel layer 4c of this cantilever type of bending element 1c has an extension 11, 12 on each of its outer sides. By means of one extension 11 the bending element 1c is fastened by means of a weld joined 6c to the base 5c, while the other extension 12 is exposed to the force F to be measured.

Figure 4:
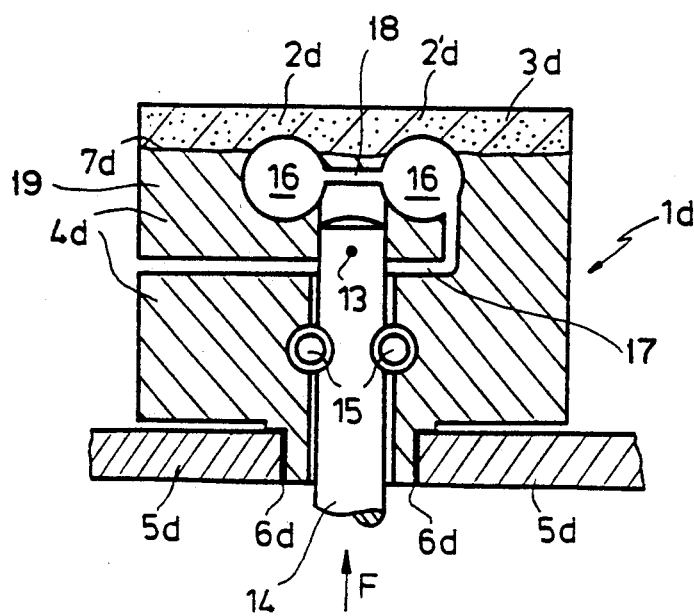
FIG. 4 is a cross-sectional view of a fourth embodiment of a force measuring apparatus with a bending element having regions arranged in series.

In the bending element 1d depicted in FIG. 4, two bending regions 2d, 2'd, following each other in succession, are formed by reductions in thickness of the sintered metal layer 3d. Those reductions are established by drilling two parallel bores into the bending element 1d at a slight distance beneath the surface 32 of the sintered metal layer 3d. The force F is transmitted by means of a force transfer element 14 which is fixedly connected by a weld point 13 to the bending element 1d while extending axially with a clearance through a part of the bending element 1d. The element 14 is optionally secured against overloading by means of lock pins 15 inserted into the corresponding bores of the steel layer 4d. The bending element 1d is in the form of a two-layer composite workpiece, with the sintered metal layer 3d including the bending regions 2d, 2'd. The bending element 1d is shaped by means of the bores 16 and also by slots 17 leading to those bores so that the weld point 13 is located on a tongue-shaped section 19 of the steel layer 4d. The bores and slots 16, 17, 18 produced subsequently by eroding (spark machining) a solid, two-layer composite blank.

Other variants of the configuration of the bending element are possible within the scope of the invention, as long as the bending element is made in the form of a sintered metal/steel composite workpiece, wherein the bending area is comprised of the sintered metal, and the bending element part to be joined to the base body is comprised of steel.

Although the present invention has been descried in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A force measuring apparatus comprising a base body and a bending element joined thereto, said bending element comprising a composite of at least first and second layers, said first layer comprised of a steel material and defining a mounting portion of said bending element joined to said base body, and said second layer comprised of a sintered material harder than said steel material and defining a bending region of said bending element which is deformed by a force being measured, said first layer being absent from said bending region, and deformation sensing means mounted on said bending region.

2. A force measuring apparatus according to claim 1, wherein said second layer includes at least one section of reduced thickness defining said bending region.

3. A force measuring apparatus according to claim 2, wherein said second layer comprises a plurality of sections of reduced thickness defining respective bending regions.

4. A force measuring apparatus according to claim 1, wherein said sintered material comprises a slintered metal.

5. A force measuring apparatus according to claim 4 including a third layer formed of said sintered material, said first layer being disposed between said second and third layers, said second and third layers defining respective bending regions.

6. A force measuring apparatus according to claim 4, wherein said sintered metal comprises a cemented carbide.

7. A force measuring apparatus according to claim 1, wherein said bending region comprises first and second sections, said second section being of smaller thickness than said first section.

* * * * *